R. ARNDT.
NUT AND THREAD LOCKING DEVICE.
APPLICATION FILED MAY 17, 1920.

1,366,687.

Patented Jan. 25, 1921.

Inventor
Rudolph Arndt,
By
Attorneys

UNITED STATES PATENT OFFICE.

RUDOLPH ARNDT, OF FLINT, MICHIGAN.

NUT AND THREAD LOCKING DEVICE.

1,366,687. Specification of Letters Patent. Patented Jan. 25, 1921.

Application filed May 17, 1920. Serial No. 381,813.

*To all whom it may concern:*

Be it known that I, RUDOLPH ARNDT, a citizen of the United States of America, residing at Flint, in the county of Genessee and State of Michigan, have invented certain new and useful Improvements in Nut and Thread Locking Devices, of which the following is a specification, reference being had therein to the accompanying drawings.

This invention relates to a nut locking device that may be advantageously used for preventing accidental displacement of a nut on a bolt, screw, tie rod or other structure, and more especially those structures subjected to vibrations which have a tendency to dislodge the nuts. For instance, rail joints and rolling stock have parts held together by bolts and nuts and the constant vibration of rolling stock in operation causes the nuts to work loose and in many instances drop off of the bolts, and it is obvious that many accidents are due to the loss of nuts in the operation of railroads.

The primary object of my invention is to furnish a bolt or other threaded member with a concealed locking device for engaging the threads of a nut and preventing counter clockwise rotation of the nut on the bolt.

With the locking device concealed by the nut it is protected against the elements and consequently cannot deteriorate to that extent as to become inactive for the purposes for which it is intended.

A further object of my invention is to provide a nut locking device that may be easily and quickly installed, and will permit of a nut being tightened to a desired degree. The device possesses other advantages that may be apparent from the following description, and reference will now be had to the drawing, wherein—

Figure 1:
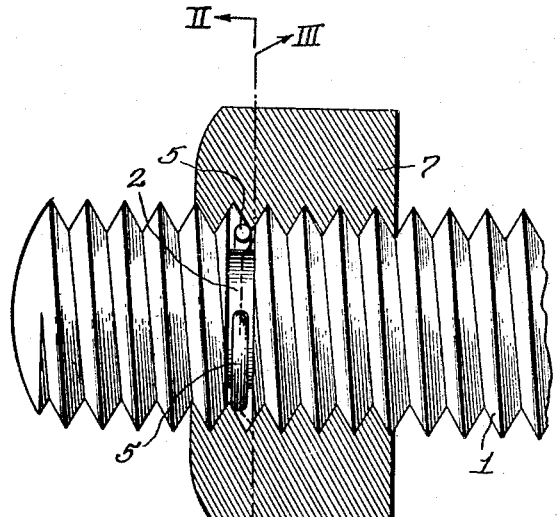
Figure 1 is a longitudinal sectional view of a nut on a threaded member, showing the locking device concealed by the nut.
Figure 2:
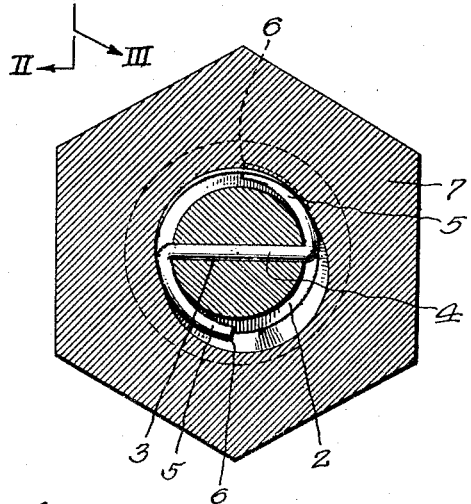
Fig. 2 is a cross sectional view taken on the line II—II of Fig. 1.
Figure 3:
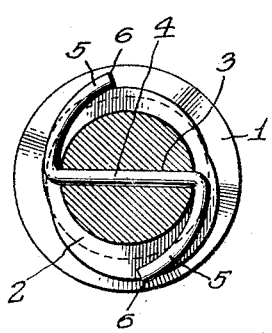
Fig. 3 is a similar view taken on the line III—III of Fig. 1 with the nut removed.

In the drawing, the reference numeral 1 denotes a screw-threaded member, as the end of a bolt, screw or tie rod and adjacent the outer end of said threaded member there is an annular groove 2 and communicating with said groove are the ends of a transverse opening 3 in the threaded member, said transverse opening intersecting the axis of the threaded member.

In the opening 3 of the threaded member is placed an automatic nut locking device comprising a semi-rigid piece of wire or like material having an intermediate portion 4 filling the opening 3 of the threaded member 1 and resilient curved end portions 5 which extend in opposite directions from the intermediate portion 4 so as to partially or wholly lie within the groove 2 of the threaded member 1. The end portions 5 are yieldable relative to the intermediate portion 4 and said end portions terminate in thread engaging teeth 6.

The reference numeral 5 denotes a conventional form of nut that may be screwed on the threaded member 1 and as the inner face of said nut encounters the end portions 5 of the locking device, said end portions recede into the groove 2 as the nut is turned in a clockwise direction on the threaded member. When any attempt is made to turn the nut counterclockwise, for instance to unscrew the nut, the resilient end portions 5 will wedge between the threads of the member 1 and the threads of the nut and prevent displacement of the nut. The teeth 6 of the locking device will also forcibly engage the threads of the nut 7 and may more or less mutilate the threads, but not to such an extent as to render the nut useless. With the teeth interrupting or "biting" into the nut threads, the teeth will positively provide abutments to prevent counterclockwise rotation of the nut under ordinary circumstances, since the end portions 5 will be backed or braced by the walls of the nut. They however, may be removed by using a wrench or any suitable tool, permitting of sufficient leverage being obtained. The locking device may be broken during the removal of the nut, but under no circumstances are the threads of the member 1 injured. If it is not desired to use the removed nut again, another nut may be substituted therefor, and when the locking device is broken or injured, it is an easy matter to install another device.

I attach considerable importance to the fact that the nut locking device is housed within the groove of the threaded member 1 and that when the nut is in place the groove is closed, thus preventing the resilient end portions of the nut locking device from being crystallized or deteriorating by exposure to the elements. Furthermore, with the nut locking device concealed there is nothing protruding from the nut that prohibits the use of an ordinary wrench or tool, or which would obstruct other equipment that might be associated with a threaded member and nut.

One embodiment of my invention has been illustrated, but it is to be understood that the structural elements are susceptible to such variations and modifications as fall within the scope of the appended claim.

What I claim is:

The combination of a threaded member having an annular groove and a transverse opening intersecting the longitudinal axis of said threaded member, and a device having an intermediate portion mounted in the transverse opening of said threaded member, said device having curved end portions in the annular groove of said threaded member and providing thread engaging teeth adapted to engage the threads of a nut screwed on said member so as to prevent accidental displacement of said nut.

In testimony whereof I affix my signature in the presence of two witnesses.

RUDOLPH ARNDT.

Witnesses:
CLETUS BUSH,
HELEN M. DOYLE.